US012706556B2

(12) United States Patent
Kanchan et al.

(10) Patent No.: US 12,706,556 B2
(45) Date of Patent: Aug. 11, 2026

(54) METHOD OF REDUCING MECHANICAL VIBRATIONS OF A MOTOR SYSTEM

(71) Applicant: ABB Schweiz AG, Baden (CH)

(72) Inventors: Rahul Kanchan, Västerås (SE); Omer Ikram Ul Haq, Surahammar (SE); Pedro Rodriguez, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 135 days.

(21) Appl. No.: 18/598,085

(22) Filed: Mar. 7, 2024

(65) Prior Publication Data

US 2024/0333184 A1 Oct. 3, 2024

(30) Foreign Application Priority Data

Mar. 29, 2023 (EP) .................................... 23164938

(51) Int. Cl.
*H02P 23/04* (2006.01)
*H02P 23/00* (2016.01)
*H02P 23/14* (2006.01)

(52) U.S. Cl.
CPC .......... *H02P 23/04* (2013.01); *H02P 23/0004* (2013.01); *H02P 23/14* (2013.01)

(58) Field of Classification Search
CPC ....... H02P 23/04; H02P 23/0004; H02P 23/14
USPC .............................. 318/400.15, 400.01, 700
See application file for complete search history.

(56) References Cited

U.S. PATENT DOCUMENTS 6,262,547 B1 * 7/2001 Kifuku ................. B62D 5/0466 180/443
6,322,060 B1 * 11/2001 Mayama ................. F16F 15/02 267/136
8,164,284 B2 * 4/2012 Ura ....................... B60L 3/0061 318/400.15
10,814,910 B2 * 10/2020 Park .......................... F16F 7/00
2007/0170788 A1 7/2007 Werner
2013/0057191 A1 3/2013 Yoshiura et al.
2014/0103756 A1 4/2014 Grillenberger et al.
2014/0117797 A1 5/2014 Grillenberger et al.
2014/0123760 A1 5/2014 Klos et al.
2017/0012487 A1 1/2017 Weiss et al.
2023/0025973 A1 1/2023 Rodriguez et al.

FOREIGN PATENT DOCUMENTS

CN 114070136 A 2/2022
CN 114157208 A 3/2022
DE 102011003597 A1 8/2012
EP 1191670 A2 3/2002
(Continued)

OTHER PUBLICATIONS

Extended European Search Report; Application No. 23164938.5; Completed: Sep. 6, 2023; Mailing Date: Sep. 13, 2023; 7 Pages.

*Primary Examiner* — David Luo
(74) *Attorney, Agent, or Firm* — Greenberg Traurig, LLP

(57) ABSTRACT

A method of reducing mechanical vibrations of a motor system including an electric motor, the method including: a) receiving a vibration-related signal based on measurements by one or more sensors mounted on the electric motor, b) generating a reactive torque reference based on the vibration-related signal, and c) controlling the electric motor based on the reactive torque reference and a main torque reference to counteract the mechanical vibrations.

16 Claims, 3 Drawing Sheets

(56) References Cited

FOREIGN PATENT DOCUMENTS

| | | | |
|---|---|---|---|
| EP | 3142246 | A1 | 3/2017 |
| JP | 5316424 | B2 | 10/2013 |
| WO | 2007131889 | A1 | 11/2007 |

* cited by examiner

METHOD OF REDUCING MECHANICAL VIBRATIONS OF A MOTOR SYSTEM

TECHNICAL FIELD

The present disclosure generally relates to electric motors.

BACKGROUND

Severe vibrations of the foundation of an electrical motor occur when an electrical motor operates at natural frequencies of the mechanical body, i.e., of the entire motor assembly, including the stator, the rotor, motor end plates, and connected load if any, etc. Traditionally, this problem has been resolved by making design modifications to the mechanical assembly to alter the natural frequency modes. This involves either design modifications to the machine itself, replacing machine bearings with higher damping factor or modifications of the mounting assembly, etc.

Another approach with electrical motors fed from a frequency converter is to use frequency skip functions which prohibits the operation of the machine at critical speeds. Still during acceleration and deceleration of motor, there are instances when machine speed passes through the natural frequency and results in large vibrations. Also, the natural frequency of the mechanical body will change over the period due to mechanical wear, tear, and bearing degradation, resulting in different unbalance to the rotating mass. The correct natural frequencies must be measured and accordingly skip frequencies must be modified. This is costly, time consuming and can cause halt in machine operation which may not be feasible in certain applications.

A better approach, realised by the present inventors, is to use a frequency converter to inject a reactive torque reference which is added to the torque reference generated by the frequency converter's speed controller. This additional torque generates counter forces in the air gap of the machine which leads to suppression of machine vibrations. The machine vibrations at critical frequencies are damped in both steady state as well as dynamic machine operating conditions.

SUMMARY

Thus, in view of the above an object of the present disclosure is to provide a method which solves or at least mitigates the problems of the prior art.

There is hence according to a first aspect of the present disclosure provided a method of reducing mechanical vibrations of a motor system including an electric motor, the method comprising: a) receiving a vibration-related signal based on measurements by one or more sensors mounted on the electric motor, b) generating a reactive torque reference based on the vibration-related signal, and c) controlling the electric motor based on the reactive torque reference and a main torque reference to counteract the mechanical vibrations.

Thus, the vibration performance of the electric motor during operation may be improved. Additionally, the operating speed range of the electric motor is increased as it can be operated at the natural frequency of the motor system. Additionally, the lifetime of the bearings of the electric motor is increased, and the structural noise as a result of vibrations is reduced. There is also no need for any mechanical modifications to reduce the vibrations.

Reactive torque is torque that oscillates periodically around a value, which may be zero or offset from zero.

According to one embodiment the measurements are horizontal vibration measurements, and the vibration-related signal is horizontal vibrational velocity, horizontal vibrational acceleration, or horizontal vibration displacement.

According to one embodiment step b) involves determining a control error which is the difference between a parameter related to an amplitude of or an amplitude of the vibration-related signal and a set point that is zero, and feeding the control error to a controller, the controller being a Proportional Integrator, PI, controller or a Proportional Resonant, PR, controller.

One embodiment comprises comparing the amplitude of the vibration-related signal with a threshold value in a threshold module, wherein the output of the threshold module is fed to a difference module configured to determine the control error, wherein the output of the threshold module is held to zero as long as the amplitude is below the threshold value, and set to the amplitude of the vibration-related signal if the amplitude is above the threshold value.

For PI controllers, there is always some feedback from the sensors, and this can saturate the integration part of the PI controller. Due to the threshold module, this can be prevented.

According to one embodiment the controller is a PI controller, wherein step b) involves phase-shifting an output from the PI controller to the same phase as the vibration-related signal to obtain the reactive torque reference.

Due to the nature of the control error signal, the output of the PI controller is out of phase with respect to the vibration-related signal. The phase shifting ensures that the reactive torque reference has the right phase with respect to the vibrations in the motor system such that negative interference for vibration cancellation can be achieved.

According to one embodiment the phase-shifting is performed by means of a Phase Locked Loop, PLL.

According to one embodiment a resonant part of the PR controller is tuned to a frequency corresponding to a natural frequency of the motor system.

One embodiment comprises feeding the reactive torque reference to an approximate model of the electric motor driven by a control system, which models the gain and phase response of the motor system when reactive torque is injected at a natural frequency of the motor system, to obtain an estimated reactive vibrational velocity, and determining a difference between the estimated reactive vibrational velocity and the vibration-related signal, the difference being an estimation of vibrational velocity due to external excitation of the electric motor, and determining the reactive torque reference anew based on the difference, wherein the new reactive torque reference is used in step c) to control the electric motor.

The output of PI-type or PR-type controllers is increased to a value sufficient to suppress mechanical vibrations below acceptable limits. Still, there are always small vibrations presents in the machine structure, which drive the PI-type controller to saturate, leading to dynamic stability issues. Thus, it is still not known what the optimal compensation signal should be. The use of Phase Locked Loop (PLL) in the control system is another source of instability issue while motor speed is undergoing dynamic changes. The delay caused by synchronization of the PLL leads to suboptimal operation of the vibration controller and can even lead to control instability issues.

By using the parameters determined by the method in an adaptive closed-loop control strategy, the gain and the phase of the injected reactive torque can be controlled adaptively during electric motor operation. Without these parameters, the information regarding the external excitation caused by vibrations at the natural frequency is lost when the counteracting vibrations are injected by the reactive torque. An accurate model of the motor system, excluding the external excitation force can be obtained based on the gain and the phase response, and the external excitations may be reconstructed from the total vibrations, i.e., the vibrations generated by external resonance excitation and resonance excited by the reactive torque, using the gain and the phase response. Based on the gain the exact amplitude of the reactive torque to be injected to essentially completely compensate for horizontal vibrations can be obtained. The phase response is used to set the phase angle of the reactive torque, instead of using a PLL.

According to one embodiment the determining of the new reactive torque reference involves inverting the estimation of vibrational velocity to obtain a reactive vibrational velocity reference, multiplying the reactive vibrational velocity reference with the inverse of the modelled gain in an inverse gain multiplier module, and adding a variable delay to the output of the inverse gain multiplier module to obtain the new reactive torque reference.

One embodiment comprises determining a phase difference between the estimated reactive vibrational velocity and the estimation of vibrational velocity due to external excitation, determining a difference between the number pi and the phase difference, to obtain a phase error, feeding the phase error to a PI controller, and converting the output of the PI controller from phase to time and thereby obtain the variable delay.

There is according to a second aspect of the present disclosure provided a computer program comprising computer code which when executed by processing circuitry of a control system causes the control system to perform the method of the first aspect.

There is according to a third aspect of the present disclosure provided a control system for reducing mechanical vibrations of an electric motor, the control system comprising: a storage medium comprising computer code, and processing circuitry configured to execute the computer code, causing the control system to perform the method of the first aspect.

The control system may comprise a variable speed drive (VSD) for main control tasks. The vibration control can be implemented on the VSD or using a separate controller.

There is according to a fourth aspect provided a motor system comprising: an electric motor, and a control system of the third aspect configured to control the electric motor.

Generally, all terms used in the claims are to be interpreted according to their ordinary meaning in the technical field, unless explicitly defined otherwise herein. All references to "a/an/the element, apparatus, component, means", etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
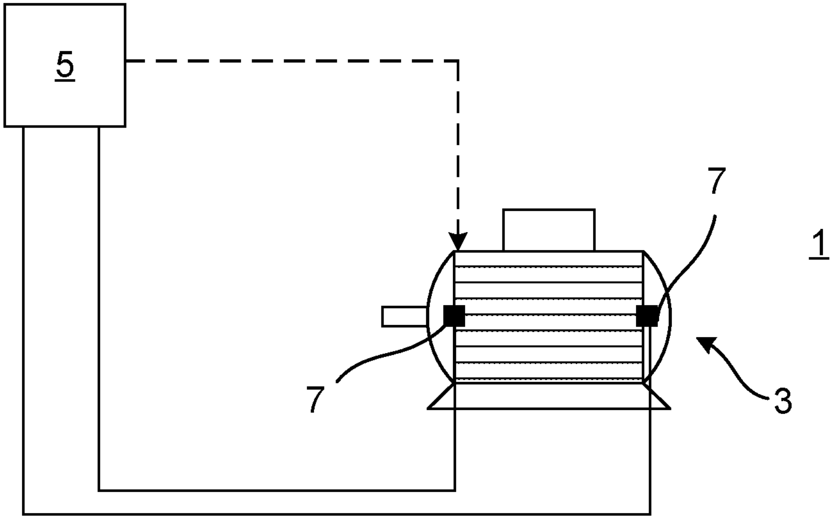
FIG. 1 schematically shows a motor system.

FIG. 1 shows an example of a motor system 1. The motor system 1 comprises a motor assembly including an electric motor 3, the foundation on which the electric motor 3 stands, and the outer cover of the electric motor 3. The motor system 1 also comprises a control system 5 configured to control the electric motor 3, and a plurality of sensors 7.

The sensors 7 are configured to make measurements of a vibration-related parameter such as acceleration, vibrational velocity, displacement, or sound, of the motor system 1. The sensors 7 may thus for example be accelerometers, displacement sensors, or microphones. In case of accelerometers, the sensors may for example be arranged to measure horizontal acceleration, i.e., acceleration in the horizontal plane.

Figure 2:
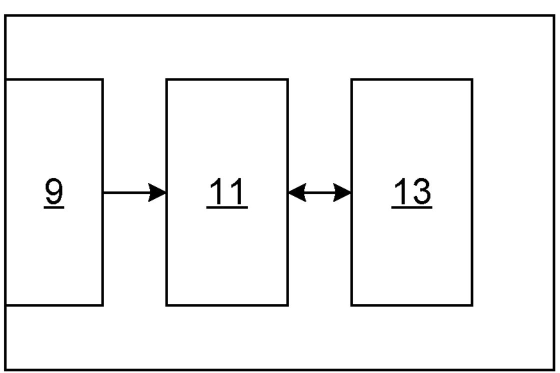
FIG. 2 schematically shows a block diagram of a control system.

FIG. 2 schematically depicts a block diagram of an example of the control system 5. The control system 5 is configured to control the electric motor 3. In particular, the control system 5 is configured to reduce mechanical vibrations of the motor assembly while the electric motor 3 is in operation.

The control system 5 comprises an input unit 9 configured to receive a vibration-related signal based on measurements from the sensors 7.

The control system 5 comprises processing circuitry 11 configured to process the vibration-related signal.

According to one example, the control system 5 may comprise a signal conditioner which converters the measurements to the vibration-related signal. For example, the sensors 7 may be accelerometers, and the signal conditioner may be configured to convert the acceleration to vibrational velocity, which according to an example may be the vibration-related signal. The vibration-related signal is then processed by the processing circuitry 11.

The control system 5 may comprise a storage medium 13. The storage medium 13 may comprise a computer program including computer code which when executed by the processing circuitry 13 causes the control system 5 to perform a method as disclosed herein.

The processing circuitry 11 may for example use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning reducing vibrations of the motor system 1.

The storage medium 13 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

A method of reducing mechanical vibrations of a motor system 1 will now be described with reference to FIG. 3.

In a step a) the vibration-related signal is received by the control system 5. The vibration-related signal is based on measurements by the one or more sensors 7. The vibration-related signal may for example be measurements directly measured by the sensors 7 or they may be converted by the signal conditioner from for example horizontal acceleration caused due to vibrations, to vibrational velocity.

In a step b) a reactive torque reference $\tau^*_{reactive}$ is generated based on the vibration-related signal 15.

In a step c) the electric motor 3 is controlled based on the reactive torque reference $\tau^*_{reactive}$ and a main torque reference $T_{ref}$ to counteract the mechanical vibrations in the electric motor 3 and the motor system 1 as such. Specifically, this combined torque produces a net force used as control force in vibration suppression. The main torque reference $T_{ref}$ may be generated by a speed controller.

Figure 3:
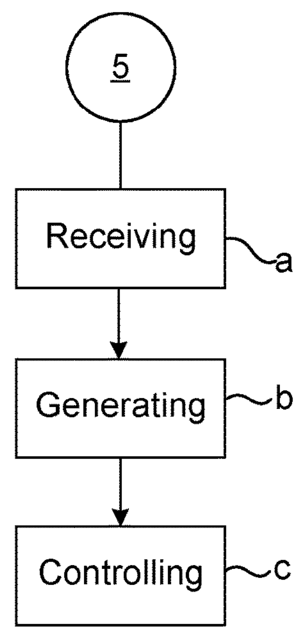
FIG. 3 is a flowchart of a method of reducing vibrations of the motor system.
Figure 4:
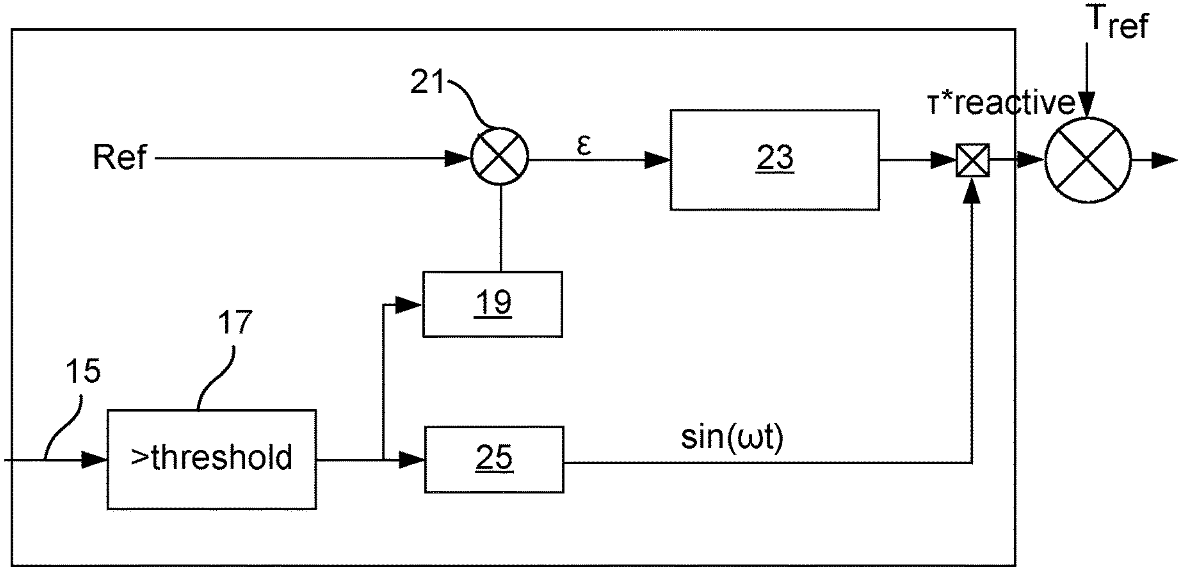
FIG. 4 shows block diagram of an example of a control scheme for reducing vibrations of the motor system.

With reference to FIG. 4, a first example of a control scheme realising the method in FIG. 3 will now be described.

According to the example in FIG. 4, step b) involves comparing the amplitude of the vibration-related signal 15 with a threshold value in a threshold module 17. The output of the threshold module 17 is held to zero as long as the amplitude is below the threshold value. If the amplitude is above the threshold value, the output of the threshold module 17 is set to the amplitude of the vibration-related signal 15.

The output of the threshold module 17 is according to one example fed to a root mean square (RMS) module 19. The RMS module 19 determines the RMS value of the vibration-related signal 15. The RMS value of the vibration-related signal 15 is a parameter related to the amplitude of the vibration-related signal 15. The RMS value of the vibration-related signal 15 is fed to a difference module 21 which determines the control error E. The control error $\varepsilon$ is in this example the difference between the RMS value of the vibration-related signal 15 and a set point, Ref, that is zero. The control error $\varepsilon$ is fed to a PI controller 23.

The output of the threshold module 17 is also fed to a PLL 25. The PLL 25 is configured to output a unity amplitude in phase with the vibration-related signal 15. The output of the PLL 25 phase-shifts the output from the PI controller 23 to the same phase as the vibration-related signal 15 to obtain the reactive torque reference $\tau^*_{reactive}$.

The reactive torque reference $\tau^*_{reactive}$ is added to the main torque reference $T_{ref}$ for controlling and counteract the mechanical vibrations in the motor system 1 in step c).

Figure 5:
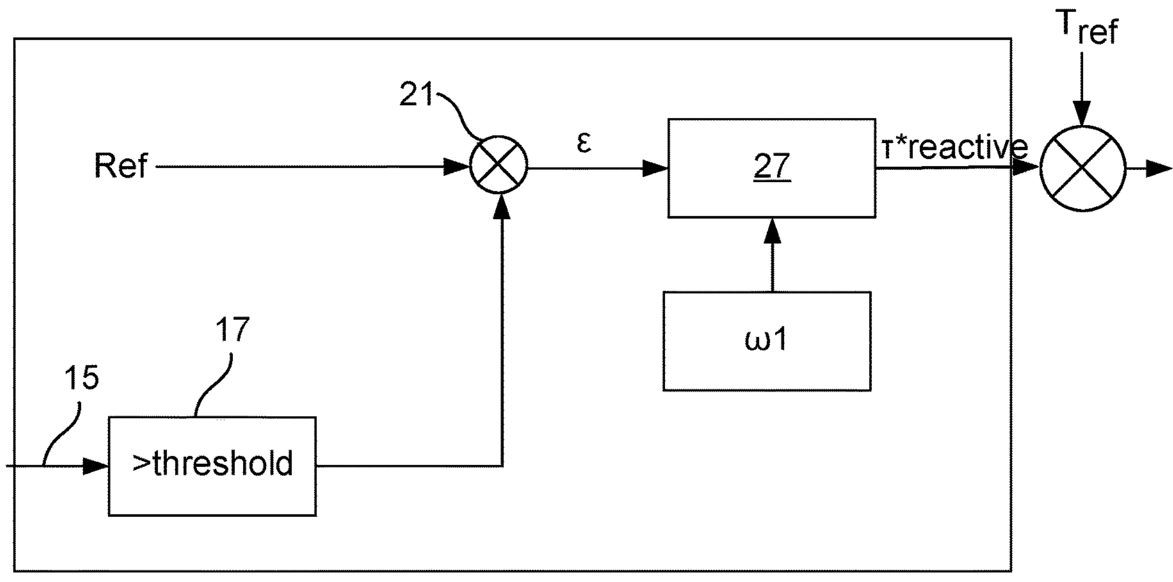
FIG. 5 depicts a block diagram of another example of a control scheme for reducing vibrations of the motor system.

FIG. 5 depicts a second example of a control scheme realising the method in FIG. 3. According to the example, step b) involves comparing the amplitude of the vibration-related signal 15 with a threshold value in a threshold module 17. The output of the threshold module 17 is held to zero as long as the amplitude is below the threshold value. If the amplitude is above the threshold value, the output of the threshold module 17 is set to the amplitude of the vibration-related signal 15.

The output of the threshold module 17 is fed to a difference module 21 which determines the control error E. The control error $\varepsilon$ is in this example the difference between a set point, Ref, that is zero and the amplitude of the vibration-related signal 15. The control error is thus typically the negative value of the vibration-related signal 15. The control error $\varepsilon$ is fed to a PR controller 27.

The task of the PR controller 27 is to track a reference sinusoidal signal. The PR controller 27 does not require RMS amplitude calculations of the vibration-related signal 15. An advantage of the control structure is that the PR controller 27 directly acts on sinusoidal input signals. The resonant part of the PR controller 27 may be modelled as a double integrator, one each in forward and feedback path. The PR controller 27 is tuned to a frequency corresponding to the natural frequency $\omega$1 of the motor system 1. Depending on the type of motor system 1, there could be more than one natural frequencies, and in this case the PR controller 27 would be tuned to all the natural frequencies.

The reactive torque reference $\tau^*_{reactive}$ is added to the main torque reference $T_{ref}$ for controlling and counteract the mechanical vibrations in the motor system 1 in step c).

Figure 6:
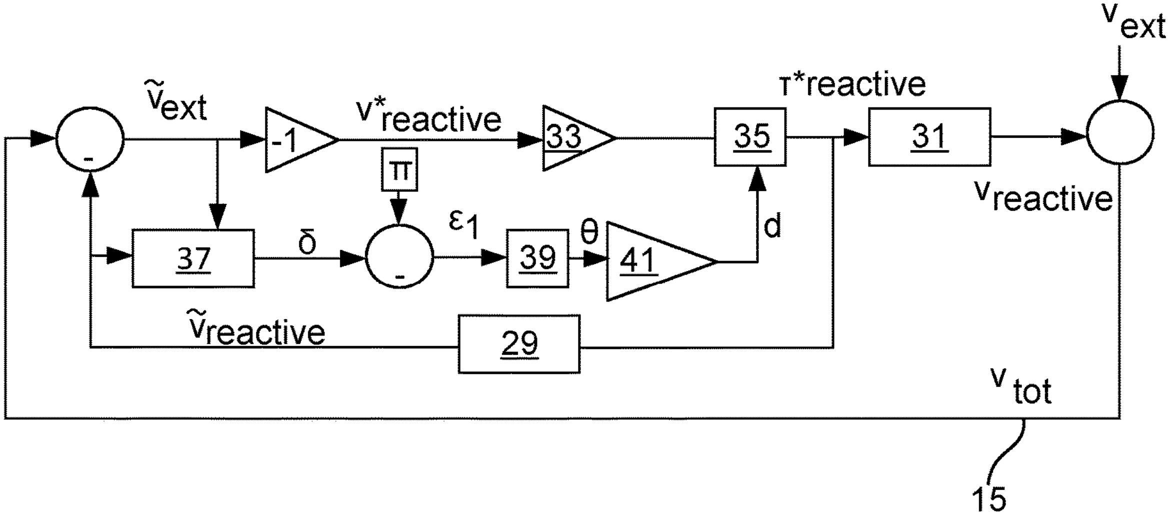
FIG. 6 shows block diagram of yet another example of a control scheme for reducing vibrations of the motor system.

FIG. 6 shows yet another control scheme realising the method in FIG. 3. The control scheme is an adaptive closed-loop control strategy for cancellation of vibrations. According to this example, gains and phase responses of the motor system 1 at the natural frequency of the motor system 1, obtained for different reactive torque magnitudes are used to form an approximate model 29. The approximate model 29 models the motor system 1 and is composed of multiple non-linear dynamical systems, including all relevant properties of mechanical, control, and electromagnetics of the motor system 1.

The reactive torque reference $\tau^*_{reactive}$ is fed to the approximate model 29. By means of the approximate model 29, an estimated reactive vibrational velocity $\tilde{v}_{reactive}$, is obtained based on the reactive torque reference $\tau^*_{reactive}$.

The reactive torque reference $\tau^*_{reactive}$ is also fed to a drive line 31, which represents a power converter, such as a variable frequency drive, which controls the electric motor 3, the electric motor 3, and the sensors 7. The reactive torque reference $\tau^*_{reactive}$ used for motor control results in the generation of reactive vibrational velocity $v_{reactive}$ in the drive line 31, and a vibrational velocity $v_{ext}$ due to external excitation of the drive line 31. The total vibrational velocity $v_{tot}$ is the sum of the reactive vibrational velocity $v_{reactive}$ and the vibrational velocity $v_{ext}$ and is in this example the vibration-related signal 15. The total vibrational velocity $v_{tot}$ is obtained based on measurements by the sensors 7, which for example measure acceleration such as horizontal acceleration.

The difference between the estimated reactive vibrational velocity $\tilde{v}_{reactive}$ and the total vibrational velocity $v_{tot}$, is obtained and this difference is an estimation of vibrational velocity $\tilde{v}_{ext}$ due to external excitation of the electric motor 3. The estimation of vibrational velocity text due to external excitation of the electric motor 3, which is a constant, is then inverted by multiplication with −1 for destructive interference. This results in a reactive vibrational velocity reference $v^*_{reactive}$. In an inverse gain multiplier module 33, the reactive vibrational velocity reference $v^*_{reactive}$ is converted to a preliminary reactive torque reference. The conversion may be obtained by multiplying the reactive vibrational velocity reference $v^*_{reactive}$ with the inverse of the modelled gain. The phase of the preliminary reactive torque reference is then corrected by means of a time delay module 35 to obtain the reactive torque reference $\tau^*_{reactive}$ anew.

The phase of the preliminary reactive torque reference may be determined as follows. A phase difference $\delta$ between the estimated reactive vibrational velocity $\tilde{v}_{reactive}$ and the estimation of vibrational velocity $v_{ext}$ due to external excitation is determined by a phase shift calculating module 37. According to the example, a difference between π and the phase difference δ, is then determined to obtain a phase error ε1. The number π is the phase reference of the injected reactive torque relative to the total vibrational velocity $v_{tot}$, resulting in destructive interference. The phase error ε1 is fed to a PI controller 39. A phase output θ of the PI controller 39 is converted from phase to a time delay in a phase conversion module 41. This time delay is used by the time delay module 35 to obtain the new value of the reactive torque reference $\tau^*_{reactive}$.

The gains and phase responses may be identified in test runs as will be explained briefly in the following.

In a first step a frequency of an oscillating reactive torque injected into the electric motor 3 is swept. The swept range is selected to cover the expected natural frequency of the motor system 1.

The reactive torque is injected into the electric motor 3. The reactive torque reference $\tau^*_{reactive}$ to obtain the reactive torque in the electric motor 3 may be expressed as:

$$\tau^*_{reactive} = |\tau| \cdot \sin(2\pi f_{inj} \cdot t),$$

where $f_{inj}$ is a frequency in the range of frequencies that is being swept and |τ| is the amplitude of the reactive torque.

The reactive torque injected in the first step preferably has a constant amplitude.

The vibration-related parameter used for determining the gains and phase responses may according to one exemplary embodiment be vibrational velocity of the motor system 1. The reactive vibrational velocity may for example be detected as acceleration by the sensors 7, which is converted to vibrational speed by the signal conditioner. The reactive vibrational velocity is the velocity of the vibrations of the motor assembly generated as a result of the injected reactive torque. Generally, the total vibrational velocity of the motor system 1, which may be the vibration-related signal 15, is given by $v_{tot}=v_{reactive}+v_{ext}$, where $v_{ext}$ is the vibrational velocity of all vibrations other than $v_{reactive}$. If the rotor is at a standstill during the first step, i.e., at zero rotational speed, the measurements by the sensors 7 results in $v_{reactive}$ because in this case $v_{ext}$ is zero. This also holds if e.g., displacement is measured by the sensors 7 instead of acceleration. Hereto, according to one example, the electric motor 3 is at standstill during the first step.

The natural frequency of the motor system 1, is where the reactive vibration-related parameter, in this example vibrational velocity, attains its maximum amplitude.

In a second step the natural frequency of the motor system 1 is determined by identifying the frequency of the reactive torque injected in the first step, and thus of the vibration-related parameter, which generates the maximum amplitude.

In a third step, the magnitude of reactive torque oscillating at the natural frequency, injected to the electric motor 3, is incrementally increased. The incremental increase may for example be from a level of 1% of the nominal torque to a level of 10% of the nominal torque, for example in steps of 1 percentage point, i.e., 1%, 2%, 3%, . . . , 10% of the nominal torque.

In a fourth step, a magnitude of the vibration-related parameter is obtained for each magnitude of the reactive torque injected in the third step.

The third and the fourth step may be carried out at standstill of the rotor.

In a fifth step, for each magnitude of the injected reactive torque a gain and a phase response of the motor system 1 is determined.

Each gain is determined based on the magnitude of the injected reactive torque in the third step and the corresponding magnitude of the vibration-related parameter. In particular, each gain is determined by a ratio between the magnitude of the vibration-related parameter and the magnitude of the injected reactive torque. Thus, for example for the reactive torque injected at 1% of the nominal torque, with the vibration-related parameter being vibrational velocity, the absolute value of the total vibrational velocity, which is equal to the absolute value of the reactive vibrational velocity at standstill of the rotor, is divided with the absolute value of the reactive torque.

Each phase response is determined based on a phase angle of the injected reactive torque and a phase angle of the corresponding vibration-related parameter. In particular, each phase response is determined by a difference between the phase angle of the vibration-related parameter and the phase angle of the injected reactive torque. The vibration-related parameter oscillates and thus has a phase angle, while the phase angle of the injected reactive torque is known by the control system 5.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of reducing mechanical vibrations of a motor system including an electric motor, the method comprising:

a) receiving a vibration-related signal based on measurements by one or more sensors mounted on the electric motor, b) generating a reactive torque reference based on the vibration-related signal, and c) controlling the electric motor based on the reactive torque reference and a main torque reference to counteract the mechanical vibrations.

2. The method as claimed in claim 1, wherein the measurements are horizontal vibration measurements, and the vibration-related signal is horizontal vibrational velocity, horizontal vibrational acceleration, or horizontal vibration displacement.

3. The method as claimed in claim 2, wherein step b) involves determining a control error which is the difference between a parameter based on an amplitude of or an amplitude of the vibration-related signal and a set point that is zero, and feeding the control error to a controller, the controller being a Proportional Integrator, PI, controller or a Proportional Resonant, PR, controller.

4. The method as claimed in claim 2, comprising feeding the reactive torque reference to an approximate model of the electric motor driven by a control system, which models the gain and phase response of the motor system when reactive torque is injected at a natural frequency of the motor system, to obtain an estimated reactive vibrational velocity, and determining a difference between the estimated reactive vibrational velocity and the vibration-related signal, the difference being an estimation of vibrational velocity due to external excitation of the electric motor, and determining the reactive torque reference anew based on the difference, wherein the new reactive torque reference is used in step c) to control the electric motor.

5. The method as claimed in claim 1, wherein step b) involves determining a control error which is the difference between a parameter based on an amplitude of or an amplitude of the vibration-related signal and a set point that is zero, and feeding the control error to a controller, the controller being a Proportional Integrator, PI, controller or a Proportional Resonant, PR, controller.

6. The method as claimed in claim 5, comprising comparing the amplitude of the vibration-related signal with a threshold value in a threshold module, wherein the output of the threshold module is fed to a difference module configured to determine the control error, wherein the output of the threshold module is held to zero as long as the amplitude is below the threshold value, and set to the amplitude of the vibration-related signal if the amplitude is above the threshold value.

7. The method as claimed in claim 6, wherein the controller is a PI controller, wherein step b) involves phase-shifting an output from the PI controller to the same phase as the vibration-related signal to obtain the reactive torque reference.

8. The method as claimed in claim 7, wherein the phase-shifting is performed by means of a Phase Locked Loop, PLL.

9. The method as claimed in claim 6, wherein a resonant part of the PR controller is tuned to a frequency corresponding to a natural frequency of the motor system.

10. The method as claimed in claim 5, wherein a resonant part of the PR controller is tuned to a frequency corresponding to a natural frequency of the motor system.

11. The method as claimed in claim 1, comprising feeding the reactive torque reference to an approximate model of the electric motor driven by a control system, which models the gain and phase response of the motor system when reactive torque is injected at a natural frequency of the motor system, to obtain an estimated reactive vibrational velocity, and determining a difference between the estimated reactive vibrational velocity and the vibration-related signal, the difference being an estimation of vibrational velocity due to external excitation of the electric motor, and determining the reactive torque reference anew based on the difference, wherein the new reactive torque reference is used in step c) to control the electric motor.

12. The method as claimed in claim 11, wherein the determining of the new reactive torque reference involves inverting the estimation of vibrational velocity to obtain a reactive vibrational velocity reference, multiplying the reactive vibrational velocity reference with the inverse of the modelled gain in an inverse gain multiplier module, and adding a variable delay to the output of the inverse gain multiplier module to obtain the new reactive torque reference.

13. The method as claimed in claim 12, comprising determining a phase difference between the estimated reactive vibrational velocity and the estimation of vibrational velocity due to external excitation, determining a difference between the number pi and the phase difference, to obtain a phase error, feeding the phase error to a PI controller, and converting the output of the PI controller from phase to time and thereby obtain the variable delay.

14. A non-transitory computer readable storage medium containing a computer program comprising computer code which when executed by processing circuitry of a control system causes the control system to perform a method of reducing mechanical vibrations of a motor system including an electric motor, the method including:

a) receiving a vibration-related signal based on measurements by one or more sensors mounted on the electric motor, b) generating a reactive torque reference based on the vibration-related signal, and c) controlling the electric motor based on the reactive torque reference and a main torque reference to counteract the mechanical vibrations.

15. A control system for reducing mechanical vibrations of an electric motor, the control system comprising:

a storage medium including computer code, and processing circuitry configured to execute the computer code, causing the control system to perform a method of reducing mechanical vibrations of a motor system including an electric motor, the method including:

a) receiving a vibration-related signal based on measurements by one or more sensors mounted on the electric motor, b) generating a reactive torque reference based on the vibration-related signal, and c) controlling the electric motor based on the reactive torque reference and a main torque reference to counteract the mechanical vibrations.

16. A motor system comprising:

an electric motor, and a control system including a storage medium having computer code, and processing circuitry configured to execute the computer code, causing the control system to perform the method of reducing mechanical vibrations of a motor system including an electric motor, the method including:

a) receiving a vibration-related signal based on measurements by one or more sensors mounted on the electric motor, b) generating a reactive torque reference based on the vibration-related signal, and c) controlling the electric motor based on the reactive torque reference and a main torque reference to counteract the mechanical vibrations configured to control the electric motor.

* * * * *